(12) United States Patent
Steinecker

(10) Patent No.: US 7,886,964 B2
(45) Date of Patent: Feb. 15, 2011

(54) SYSTEM AND METHOD FOR PERSONALIZED E-COMMERCE

(76) Inventor: Jeffrey T. Steinecker, 24220 N. Forest Dr., Lake Zurich, IL (US) 60047

( * ) Notice: Subject to any disclaimer, the term of this patent is extended or adjusted under 35 U.S.C. 154(b) by 931 days.

(21) Appl. No.: 11/787,487

(22) Filed: Apr. 17, 2007

(65) Prior Publication Data

US 2008/0257957 A1    Oct. 23, 2008

(51) Int. Cl.
*G06Q 40/00* (2006.01)
*G06Q 30/00* (2006.01)
*G06Q 20/00* (2006.01)
*G07D 11/00* (2006.01)
*G07F 19/00* (2006.01)
*G06K 5/00* (2006.01)
*G06K 19/00* (2006.01)
*G06K 19/06* (2006.01)
*G06F 7/08* (2006.01)
*G06F 19/00* (2006.01)
*G08B 13/14* (2006.01)
*G09F 25/00* (2006.01)

(52) U.S. Cl. .................. 235/379; 235/380; 235/381; 235/487; 235/492; 235/493; 340/572.1; 340/286.01; 340/5.4; 340/5.41; 705/16; 705/65; 705/330

(58) Field of Classification Search ............... 705/16, 705/26, 65, 330; 235/379, 380, 381, 487, 235/492, 493; 340/572.1, 286.01, 5.4, 5.41
See application file for complete search history.

(56) References Cited

U.S. PATENT DOCUMENTS

| | | | |
|---|---|---|---|
| 5,515,268 A | 5/1996 | Yoda | |
| 6,356,874 B1 | 3/2002 | Ohrn | |
| 6,415,156 B1 * | 7/2002 | Stadelmann | ............... 455/466 |
| 6,636,837 B1 | 10/2003 | Nardozzi et al. | |
| 6,688,435 B1 | 2/2004 | Will et al. | |
| 6,714,797 B1 | 3/2004 | Rautila | |
| 6,810,304 B1 * | 10/2004 | Dickson | ..................... 700/241 |
| 6,915,272 B1 * | 7/2005 | Zilliacus et al. | ............... 705/26 |
| 6,920,431 B2 * | 7/2005 | Showghi et al. | ............... 705/26 |
| 6,973,435 B1 | 12/2005 | Sioufi et al. | |
| 7,069,251 B1 * | 6/2006 | Bartz et al. | ................... 705/75 |
| 7,124,939 B2 * | 10/2006 | Calaway et al. | ............. 235/383 |
| 7,209,903 B1 * | 4/2007 | Mamdani et al. | .............. 705/75 |
| 7,347,361 B2 * | 3/2008 | Lovett | ........................ 235/380 |
| 7,783,524 B2 * | 8/2010 | Horton | ........................ 705/26 |

(Continued)

*Primary Examiner*—Daniel Walsh
(74) *Attorney, Agent, or Firm*—Meroni & Meroni, P.C.; Charles F. Meroni, Jr.; Christopher J. Scott

(57) ABSTRACT

A system allows consumers the ability to remotely transmit order and/or payment preference data to a vendor to facilitate sales transactions. A personal transmitter or key fob functions to transmit a signal to the vendor when the customer approaches the vendor, which signal comprises preferred order information for vendor processing. The vendor may acknowledge order receipt, generate the order, and automatically submit the transaction for payment through a secure connection. A web site acknowledges receipt of the payment request, retrieves specific transaction information for the target vendor, and processes the payments electronically. Customer information, vendor preferences and encrypted Customer payment specific pointers are downloaded to the personal transmitter on an ongoing basis and stored as encrypted data. If multiple vendors are within the proximity of the consumer, the transmitter will signal an error and list the vendors to the consumer, from which list the target vendor may be selected.

26 Claims, 5 Drawing Sheets

U.S. PATENT DOCUMENTS

| | | | |
|---|---|---|---|
| 2001/0020198 A1* | 9/2001 | Wilson | 700/232 |
| 2001/0032191 A1 | 10/2001 | Choi et al. | |
| 2001/0039522 A1* | 11/2001 | Saxon | 705/30 |
| 2002/0023027 A1* | 2/2002 | Simonds | 705/26 |
| 2002/0038259 A1 | 3/2002 | Bergman et al. | |
| 2002/0049644 A1 | 4/2002 | Kargman | |
| 2002/0060246 A1* | 5/2002 | Gobburu et al. | 235/462.46 |
| 2002/0103713 A1 | 8/2002 | Kim | |
| 2002/0184109 A1 | 12/2002 | Hayet et al. | |
| 2002/0187774 A1* | 12/2002 | Ritter et al. | 455/414 |
| 2003/0004831 A1* | 1/2003 | Owens | 705/26 |
| 2003/0018589 A1* | 1/2003 | Jones | 705/413 |
| 2003/0050854 A1* | 3/2003 | Showghi et al. | 705/26 |
| 2003/0075600 A1* | 4/2003 | Struthers et al. | 235/381 |
| 2003/0104804 A1* | 6/2003 | Iwata | 455/414 |
| 2003/0151495 A1* | 8/2003 | Ludvigsen | 340/5.42 |
| 2003/0163384 A1* | 8/2003 | Hendra | 705/26 |
| 2003/0182242 A1* | 9/2003 | Scott et al. | 705/65 |
| 2003/0200152 A1* | 10/2003 | Divekar | 705/26 |
| 2003/0229538 A1 | 12/2003 | Nardozzi et al. | |
| 2004/0054625 A1* | 3/2004 | Kellogg et al. | 705/41 |
| 2004/0073495 A1* | 4/2004 | Calaway et al. | 705/26 |
| 2004/0220863 A1 | 11/2004 | Porter et al. | |
| 2004/0225516 A1* | 11/2004 | Bruskotter et al. | 705/1 |
| 2005/0049978 A1* | 3/2005 | Kleen | 705/72 |
| 2005/0177440 A1* | 8/2005 | Mathe et al. | 705/26 |
| 2005/0194433 A1* | 9/2005 | Zimmerman | 235/379 |
| 2005/0230472 A1* | 10/2005 | Chang | 235/383 |
| 2006/0036530 A1* | 2/2006 | Shkedy | 705/37 |
| 2006/0074768 A1* | 4/2006 | Horton | 705/26 |
| 2006/0076400 A1* | 4/2006 | Fletcher | 235/379 |
| 2006/0095328 A1* | 5/2006 | Ross et al. | 705/14 |
| 2006/0156346 A1 | 7/2006 | Kulakowski | |
| 2006/0190346 A1* | 8/2006 | Sines et al. | 705/26 |
| 2006/0190348 A1 | 8/2006 | Ofer et al. | |
| 2006/0218040 A1 | 9/2006 | Sabathypillai | |
| 2006/0230415 A1* | 10/2006 | Roeding | 725/34 |
| 2006/0235763 A1 | 10/2006 | Tate | |
| 2006/0271437 A1* | 11/2006 | Maggio | 705/14 |
| 2007/0005381 A1 | 1/2007 | Prokushev | |
| 2007/0069013 A1* | 3/2007 | Seifert et al. | 235/383 |
| 2008/0086373 A1* | 4/2008 | Aitken et al. | 705/14 |
| 2008/0308638 A1* | 12/2008 | Hussey | 235/462.11 |
| 2010/0277311 A1* | 11/2010 | Steinecker | 340/539.13 |

* cited by examiner

| PREFERENCES | 6:00AM-10:30 | 10:30-00AM-5:00 | 5:00PM AND LATER | | | ENCRYPTED |
|---|---|---|---|---|---|---|
| COMPANY | MORNING | LUNCH | DINNER | OTHER | PAY PROCESS | POINTER INDEX |
| STARBUCKS | REGULAR COFFEE WITH 2 TSP. SUGAR | REGULAR COFFEE WITH 2 TSP. SUGAR | REGULAR COFFEE WITH 2 TSP. SUGAR | | NORMAL=DEBIT ACCOUNT 23123123434323 | 789654123 |
| McDONALDS | LARGE COFFEE WITH 3 TSP. SUGAR, EGG McMUFFIN | MEDIUM COKE, FISH SANDWICH | | DELIVER TO ILLINOIS PLATE STEINY 5 | NORMAL | 123232323 |
| DRY CLEANERS | | | | MED STARCH | NORMAL | 123232323 |
| TRUE VALUE | | | | PAY ONLY | NORMAL | 123232323 |
| SPLINTERS BAR | | | MILLER HIGH LIFE | | NORMAL | 123232323 |
| DOCTOR'S OFFICE | | | | | HIT AMERICAN EXPRESS ACCOUNT 620040002323212 EXPIRES 12/07 | |
| SUBWAY | | TURKEY ON WHOLE WHEAT WITH MAYO, TOMATOES, GARDINARE, LETTUCE, PROVOLONE | | | NORMAL | 123232323 |
| WHITE HEN PANTRY | | | | | NORMAL | 123232323 |
| DIPIERO'S | | | LARGE THIN CRUST WITH TOMATOES, GARLIC, PEPPERONI, MUSHROOMS | PICK-UP | NORMAL | 123232323 |
| OFFICE MAX | | | | DISCOUNT CARD 1245321 | CORP AMEX 232212323 | 2.1212E+11 |
| ILLINOIS TOLLWAY | | | | ACCOUNT 1233223 | DEBIT CARD 1212202121 | 2.1478E+11 |
| EMILIO'S TAPAS | | | | CALL AHEAD SEATING FOR 4-STEINECKER PARTY, TABLE, NON-SMOKING | ADD 20% TO TOTAL, AMEX 232212323 | 4154747461 |
| FRANK'S ELEMENTARY SCHOOL LUNCH PROGRAM | | MAXIMUM OF $5.00 | | | CASH ACCOUNT/DEBIT ACCOUNT 23121232312 | 231231212 |
| MEDICAL ALERT | | | | ALERGIC TO PEANUTS, TYPE 2 DIABETIC-DR SMITH 312.121.2323 | | |
| GPS UNIT ID: 12332321 | | | | HOLD "COP" BUTTON DOWN FOR 10 SECONDS, START BROADCAST | AMBER ALERT-NOTIFY POLICE-CHILD ABDUCTION | |

*FIG. 7*

SYSTEM AND METHOD FOR PERSONALIZED E-COMMERCE

BACKGROUND OF THE INVENTION

1. Field of the Invention

The present invention generally relates to electronic transmission of certain predetermined data from a consumer to a merchant for the purpose of conducting trade. The data transmitted from the consumer to the merchant is an electronic order-specific for that consumer to that merchant or a predetermined means of payment.

2. Description of the Prior Art

Cashless sales transactions are relatively old, as evidenced by rather well-developed bartering and/or swapping systems in many pre-capitalist or pre-market economies. These economies are considered to have relied on tradition, top-down command, or community democracy instead of market exchange organized primarily through bartering systems. Relations of reciprocity and/or redistribution substituted for market exchange. Trade and barter were primarily reserved for trade between communities or countries. Bartering systems were also used when the monetary system failed to measure the economic value of goods. Regulated monetary systems, however, came to the forefront and provided a more reliable value of goods and services. As a result, regulated monetary systems now predominate over the art for transacting sales in Western societies. Whereas cashless sales transactions may be viewed as relatively old, electronic means for transacting sales are relatively new phenomena. Certain systems and methods for electronically transacting sales and the like are set forth briefly hereinafter.

U.S. Pat. No. 6,415,156 ('156 Patent), which issued to Stadelmann, discloses a Transaction Method. The '156 Patent teaches a transaction method for ordering goods or services by mobile telephone, an order for delivery being transmitted to the services provider via a mobile radio network. At least certain order data, in which at least a monetary amount is indicated, are packed in one or more SMS or USSD or e-mail short messages, and are transmitted to a validation platform connected to a short message service center. The indicated monetary amount is deducted from a monetary account of the customer and is transferred to a monetary account of the services provider.

U.S. Pat. No. 6,636,837 ('837 Patent), which issued to Nardozzi et al., discloses a Method and Apparatus for Ordering Photofinishing Services. The '837 Patent teaches a method, system and apparatus for displaying photofinishing goods and/or services that are being offered for sale. An apparatus is provided which includes a display device for displaying photofinishing goods and/or services that are being offered for sale and a computer for controlling what is displayed on the display device. A computer software program is also provided for programming the computer so that a plurality of the photofinishing goods and/or services will be displayed on the display device and for program monitoring the sales the photofinishing goods. The system allows for the remote reprogramming of the computer for modifying and or re-arranging the position of the photofinishing goods and/or services on the display device.

U.S. Pat. No. 6,688,435 ('8,435 Patent), which issued to Will et al., discloses Electronic Ordering of Goods with Delivery by Automatic Drive-up Storage Device. The '435 Patent teaches a method and apparatus for the order and delivery of goods in which the goods are transported to one or more storage containers that are maintained in a drive-up storage, retrieval, and dispensing mechanism. Goods are ordered via the Internet, telephone, or other electronic method, retrieved from a warehouse or store, and transported to the storage container by truck or by a regional train system designed for passenger use. The storage container accepts packages, which are placed into a plastic storage box and moved by an elevator assembly to a particular storage bin located in a matrix of bins arranged in columns and rows. When a customer arrives to pick up a package, he or she drives up to the device and communicates with the system via a keypad and display screen to identify the order and present appropriate identification of the person or other means of maintaining security. A computer verifies the identification and retrieves the storage box, presenting it to the window of the vehicle driving up at an appropriate height so that the customer can retrieve the package. The use of a handheld wireless device by the customer can aid in ordering, checking order status, obtaining directions, providing identification, and retrieving the order.

U.S. Pat. No. 6,915,272 ('272 Patent), which issued to Zilliacus et al., discloses a System and Method of Secure Payment and Delivery of Goods and Services. The '272 Patent teaches a system, method and computer program for ordering, paying for and delivering goods and services from a content provider to a user which assures the content provider that he will be paid and that assures the user that he will receive the content at an agreed upon price. Thus, this system, method and computer program facilitates business transactions occurring between parties who do not know each other by using a trusted third party to either take the user's order, deliver to the user's order, and/or bill the user the correct amount for the goods and services contracted for. This system, method and computer program relies on the Global System for Mobile (GSM) communications system to authenticate the user and provide algorithms and modules that are used to generate cipher keys and service responses so as to insure the content provider will be paid and that the user will not be overcharged. Further, these algorithms and modules are used to encrypt important information so as to prevent third parties from intercepting this important information. Five business model modules are detailed with numerous variations possible to accomplish the task of facilitating business transactions between parties that do not necessarily know or trust each other.

U.S. Pat. No. 6,973,435 ('3,435 Patent), which issued to Sioufi et al., discloses a Method and System for Ordering Services or Products, Including Prescriptions. The '3,435 Patent teaches a method and system for transmitting information included in a memory device to a remote location. The information included in the memory device could take the form of patient information as well as a prescription dosages and the remote location could be a pharmacy or a physician's office. The memory device could be fixedly attached to a drug container and a linker module would read the information contained in the memory device and automatically contact a pharmacy located at a remote location to fill a particular prescription. Information relating to the patient or the prescription which is filled can also be transferred from the remote location directly into the memory device through the linker module. In addition, the method and system can be used to order or purchase any products or services from a vendor.

United States Patent Application Publication No. 2001/0032191 which was authored by Choi et al., describes a method of paying an electronic settlement in an electronic commerce by assigning a payment settlement agency between a payer and a payee. The method includes a first step of the payer obtaining an electronic catalog from the payee through Internet; a second step of the payer approving an access of a payer's bank account by a payment settlement agency server; a third step of the payer ordering goods to a payee server and paying a settlement through of the payment settlement agency; a fourth step of the payment settlement agency server providing confirmation of an effect of transaction between the payer and the payee to concerned parties of the transaction; and a fifth step of transferring a deposit from the payer's bank account to a payee's bank account through a financial network.

United States Patent Application Publication No. 2001/0039522, which was authored by Saxon, describes an automated ordering system including a central station and numerous subscriber stations, including customer and vendor stations, whose sales transactions are regulated by the central station. A communication link, such as the Internet, permits each station to transmit and receive requisitions, purchase orders, and invoices to and from the central station. Each remote station uses its own internal item identification codes, preferably general ledger account codes, to identify products to be purchased or sold. The central station maintains a database identifying the codes used by each subscriber station and relating different codes used by other subscribing stations to identify similar products. A customer may transmit to the central station a requisition for a product identified with the customer accounting code and specifying a particular vendor. Using its database, the central station composes a purchase order addressed to the specified vendor and identifying the required product with the vendor's code. The central station monitors the entire transaction, ultimately to the parties to a transaction, accounting data in the form of ledger entries that can be immediately incorporated into their respect accounting systems. In a similar manner, the ordering system can identify vendors who supply a product desired by a customer, and automatically transmit requests for quotation to the vendors.

United States Patent Application Publication No. 2002/0038259, which was authored by Bergman et al., teaches a method and system for ordering and selling products at a venue. The invention provides a first wireless communications device associated with an attendee operable to generate an order. The order information from the attendee is communicated from the first communications device to a server. The server is queried by vendor workstations at a venue. Orders are then displayed at the vendor workstations and fulfilled by vendors who deliver ordered items to the attendee at the attendee location.

United States Patent Application Publication No. 2002/0049644, which was authored by Kargmann, teaches a system for the convenient and automated execution of a commercial transaction from a wired or wireless customer device, such as a cellular telephone. A transaction code is transmitted by the customer device to initiate the transaction. The customer device can be automatically populated with preconfigured codes for the initiation of various transactions. Advertising and other promotional materials can also be conveyed to the customer device.

United States Patent Application Publication No. 2002/0184109, which was authored by Hayet et al., teaches a method of efficient ordering of goods comprising the following steps: (a) a client interacts with an electronic shopping system to indicate his willingness to place an order, whereby said interaction optionally involves the addition of further background information to the system and/or the addition of order specific information to the system; (b) the electronic shopping system produces a suggestion of the shopping list for said client based on (1) information concerning goods which are available for ordering, their prices and optionally further information relating to said goods; and (2) information concerning the historic purchasing behavior of said client; and optionally (3) background information of said client; and optionally (4) environmental information; and (c) said client reviews said suggestion of the shopping list and optionally amends said list followed by placing the order.

United States Patent Application Publication No. 2002/0187774, which was authored by Ritter et al, teaches a method with which a mobile user in a mobile network can order products, with the following steps: recording an image corresponding to the product to be ordered, linking the image data with a personal identification of the mobile user, transmitting the linked order message to a server in said mobile radio network, comparing said image data with images stored in a product database, each of said image in said database being linked with an identification of the product provider, sending a message containing an identification of the ordered product and of the ordering mobile user to said product provider.

United States Patent Application Publication No. 2002/0198790, which is authored by Paulo et al., teaches a system and method of ordering goods or services including receiving a request for the goods or services from a user by way of a device and accessing a database having information relevant to the user and preferences, such as favorites, related to the goods or services. Then forwarding an order for the goods or services to a provider, either a store as selected or a central server for selection of a store, of the goods or services where the order is dependent on the information and receiving a reply such as an acknowledgment regarding the order from the provider. A response may then be formulated concerning the order and the reply, the response preferably dependent on capabilities of the device; and sending the response to the device using instant messaging, short messaging services or WAP messaging techniques.

United States Patent Application Publication No. 2003/0104804, which was authored by Iwata, teaches an apparatus for ordering goods or services which are advertised or promoted on a broadcast medium, such as a radio station. The apparatus includes a client terminal which may be mounted in a vehicle such as an automobile. The client terminal includes a radio transmitter for transmitting information to a service center. The client terminal also includes a push button for activation to place an order for merchandise. The signal includes the vehicle location, terminal identification, date and the frequency of the radio receiver. The service center utilizes this information to learn the identity of the merchandise being promoted and the merchant offering the merchandise. The service center then orders the merchandise for delivery to the client.

United States Patent Application Publication No. 2003/0151495, which was authored by Ludvisen, teaches an order system where the user approaches the terminal unit (1) of the service provider. To order the service, the user calls the service providers terminal unit with the mobile communication apparatus. The terminal unit registers the identification code and transmits information and conditions related to the service to the user's mobile communication apparatus, where this information is shown on a display (14). To accept the service and the service conditions, the user indicates the acceptance of the service conditions which is transmitted (5) to the terminal unit, after which the connection between the mobile communication unit and the terminal unit is terminated. The terminal unit transmits (6), for example via a telephone line, the received data to the host computer (7) where the data are controlled in connection with the service.

The control may include a check, whether the user has credit enough for payment of the order. After the control, the terminal unit receives (8) indications from the host computer (7) whether to accept the data from the user for providing the service. Acceptance may be indicated by a signal (9) at the terminal unit, for example by an audio-visual indication, after which the service is provided.

United States Patent Application Publication No. 2006/0156346, which was authored by Kulakowski, teaches a method of ordering goods and services. The customer initiates the connection to the system of ordering goods and services, unequivocally related to the received transmission and during the connection the customer orders goods or services offered by the system of ordering goods and services, which refer to the transmission. Preferably, the system of ordering goods and services is available for the whole duration of the transmission, being always available in the same manner, dynamically changing the offer of goods and services depending on the transmission, and in case of lack of the offer suitably informing the customer during the connection or optionally not servicing this connection at all.

United States Patent Application Publication No. 2006/0218040, which was authored by Sabapathypillai, teaches a method of taking a food/beverage order at a food/beverage establishment includes receiving a menu selection from a customer mobile terminal in the food/beverage establishment at a dedicated restaurant transceiver over a wireless data connection. The menu selection designates at least one food/beverage item. The menu selection may be received responsive to transmitting food/beverage menu content from the dedicated restaurant transceiver to the mobile terminal. Also, a method of ordering food/beverage items at a food/beverage establishment includes transmitting a menu selection designating at least one food/beverage item from a customer mobile terminal in the food/beverage establishment to a dedicated restaurant transceiver over a wireless data connection. The menu selection may be transmitted responsive to receiving food/beverage menu content from the dedicated restaurant transceiver. Related devices and computer program products are also discussed.

From a consideration of the foregoing disclosures, it may be seen that the prior art does not teach a system for deploying currently available technologies in a different manner to allow consumers the ability to remotely transmit order or communication data to a merchant or vendor via a pre-loaded personal transmitter to reduce time and efforts associated with doing business with that vendor. The prior art thus perceives a need for such a system and method for transacting a sale.

SUMMARY OF THE INVENTION

Accordingly, it is an object of the present invention to provide a system and method for electronically and wirelessly transmitting certain predetermined data from a consumer to a merchant for the purpose of conducting trade. The data transmitted from the consumer to the merchant is an electronic order—specific for that consumer to that merchant. Ordering this way significantly reduces the waiting time for the order to be fulfilled but it also reduces the manpower requirements for the merchant processing the order. Along with the ordering information is transmitted an encrypted data string that points to a specific customer's data on a secured web site that allows that website to process the charges for the goods or services according to the specifications established by the consumer for that Merchant. Since nothing about the consumers banking or credit is being passed to the merchant it would be worthless information if someone else stole the information. The consumer would be capable to establishing their product or service preferences on the web site as well as their payment definitions. Once the foregoing steps are completed, resultant information is downloaded to a personal ordering/payment device (POD) via a personal computer and a USB port on the device in an encrypted format. The device would store such data until it was replaced or updated by subsequent downloads by the consumer. When the consumer would be within the proximity of the merchant, they could simply depress the "go" button on their POD device and the information for that merchant (order) would be transmitted accordingly.

The consumer would be totally in charge of their own orders, the associated payments and which debit/credit cards were impacted by each transaction. Since that information would be stored on a secured website—each consumer would be responsible for maintaining security, balances on their debit/credit cards and their exposure to risk. Should any transaction appear on any of the designated accounts that is not the consumers, they could shut down the device or accounts in real-time (immediately).

Access to the web site from authorized vendors would be through the unique customer/bank account number that is created and downloaded to the POD. This unique number points the commerce clearing subsystem to the correct customer and account for processing the transaction. The unique number is only known to the POD and the Commerce server—like a rolling code on garage doors—it changes every time a download is done to enhance security. The radio transmissions are also conducted in a similar manner, so someone will have to work real hard to break into it and they will only get the data intended for a specific merchant—their order information and the pointer address. Without security to access the website, they will only get meaningless information—or worst case a charge processed for the value of the ordered goods or services.

The POD device is a standalone device or it could be part of a cellular phone. What makes it different is that proprietary communications occurs between the device and a receiver at the merchants' location—not using Bluetooth® or cellular communications, but proprietary radio frequency technology that is readily available from Motorola or other communications providers. Communications capabilities from the radio receiver to the merchant's point of sale are readily available as is the capability to process the charges to the financial intermediary.

This patent application is not intended to focus on those processes, but the process of allowing the consumers the ability to establish their own ordering preferences and payment preferences and the initiation of the ordering of goods or services with the encrypted data stored and communicate through a portable ordering/payment device (POD).

The Pod can also be used to identify the owner, the owners medical issues and even become a personal locator—by activating a GPS (Global Positioning System) chip imbedded in the keyfob, a child that is lost or abducted can notify everyone of their location. The data on the keyfob is useless to someone who steals it—so it would reduce the threat of theft.

BRIEF DESCRIPTION OF THE DRAWINGS

Other features of my invention will become more evident from a consideration of the following brief description of patent drawings:

FIG. 7 is a generic screen shot depicting a grid-like table for inputting and amending a purchaser's order preference data and payment data.

DETAILED DESCRIPTION OF THE PREFERRED METHODOLOGY(IES)

A personal transmitter or key fob 10 transmits a signal to the vendor establishment 20 that the customer has arrived in proximity to the establishment and that the customer would like to order a specific product or service. The receiving vendor's point of sale system will then acknowledge receipt, generate the order and automatically submit the transaction for payment through a secured internet connection. The secured web site as at 11, which web-site is maintained by the consumer, acknowledges the receipt of the payment request—retrieves the specific transaction information for that specific vendor—and processes the payments electronically as requested.

Customer information, vendor preferences and encrypted Customer payment specific pointers are downloaded to the remote transmitter or key fob 10 through a USB port on an ongoing basis and stored as encrypted data. When in proximity of the specific vendor, the consumer simply pushes the transmit button on the key fob 10. The transmission is received by a receiver and acknowledged back to the key fob so the consumer can verify it was received. If multiple receivers are within the proximity of the consumer, it is contemplated that the key fob 10 may provide an error message and means for displaying or presenting the different vendors to the consumer will become actuated. Said means thus allow the consumer to validate which vendor they intend to do business with by validating with a confirm signal from the key fob 10.

Figure 3:
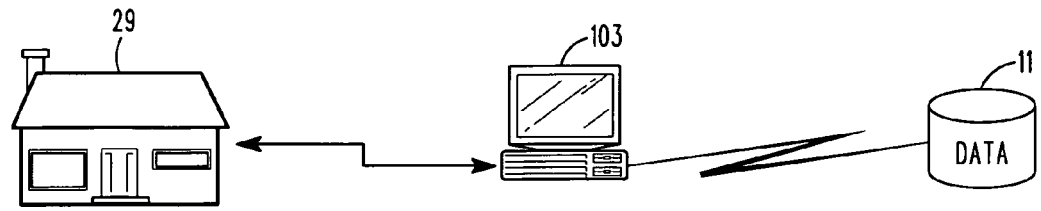
FIG. 3 is a schematic type depiction of a residence in communication with central processing means (symbolized by a desktop type personal computer), which central processing means is in communication with an off-site database.
Figure 4:
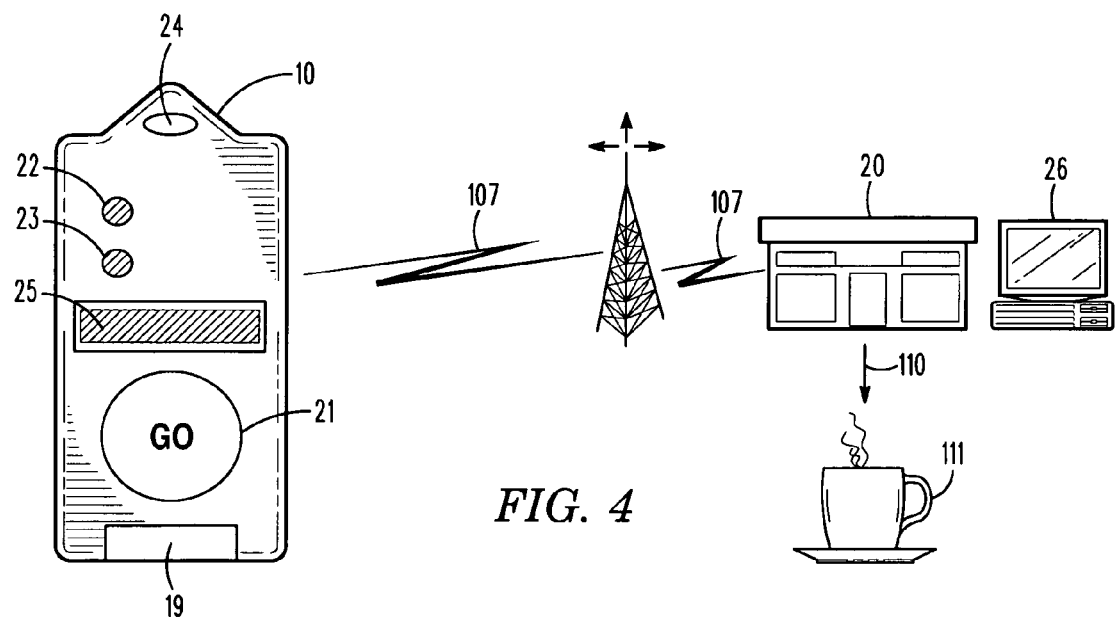
FIG. 4 is a schematic type depiction of an intelligent device transmitting data to a generic vendor establishment by way of radio frequency transmission means, the generic vendor establishment having payment processing means (as symbolized by a cash register) and means for processing an order (as symbolized by a coffee cup).
Figure 6:
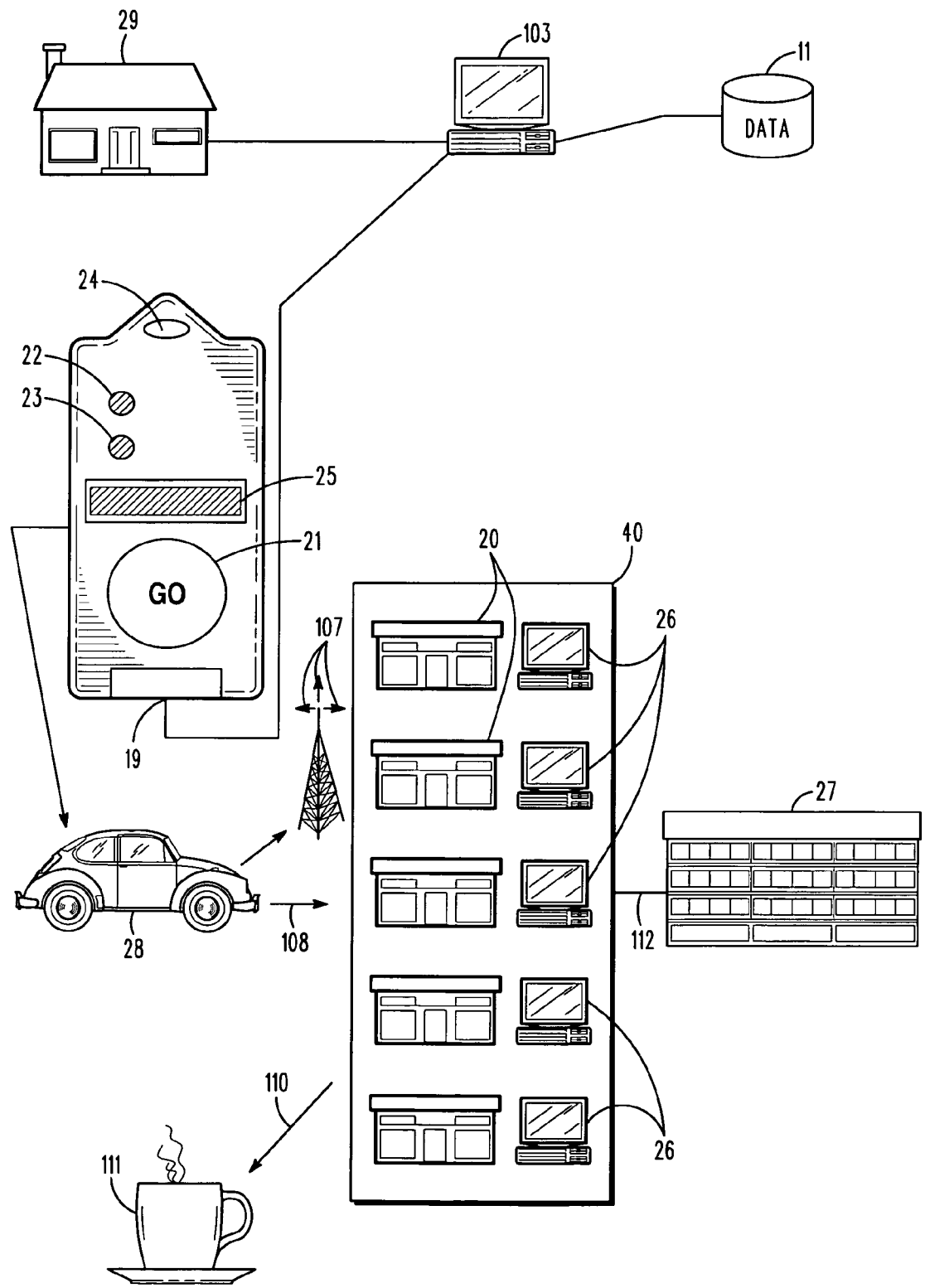
FIG. 6 is a schematic expanded type flow chart symbolically depicting certain purchasing methodology according to the present invention otherwise depicted in FIGS. 3-5.

Referring now to the drawings with more specificity, it is contemplated that the present invention essentially comprises a purchasing system and method for effecting a purchase or transaction method by way of an intelligent device such as a key fob 10 or cellular telephone as generally illustrated and referenced in FIGS. 4 and 6. It is contemplated that the purchasing system of the present invention preferably comprises or incorporates the use of a secure web-site or Internet-based database 11 as generically illustrated and referenced in FIGS. 3 and 6. The secure web-site or Internet-based database 11 preferably comprises certain means for receiving and storing a purchaser's order preference data (as generally referenced at 100) and a payment preference data (as generally referenced at 101) as exemplified in FIG. 7. In other words, it is contemplated that the Internet-based database 11 may well function to track customers' or consumer's order preferences, charges, and credit availability. It is contemplated that an annual fee may be charged for the web-hosting services according to the present invention.

It is contemplated that the system may further comprise certain means for inputting a purchaser's order preference data as may be defined by state of the art data inputting means for accessing and interacting with a web-site such as a keyboard and/or mouse otherwise cooperable with a monitor and central processing unit for enabling the user or purchaser to input and update data at the web-site. The means for inputting a purchaser's order and payment preference data is thus generically symbolized by a personal computing type unit 103 as referenced in FIGS. 3 and 6. After accessing the web-site 11 by way of the personal computing unit 103 (whether from a business site or residential site (as at 104 in FIGS. 3 and 6), the order and payment preference template 105 as generally illustrated and depicted in FIG. 7 may be amended or updated as per the preference of the purchaser. It may be readily understood from an inspection of FIG. 7 that any number of vendors (offering various goods and services) and order and payment preferences may be tracked and updated at the web-site 11. For example, a customer may access the web-site 11 and update his or her personal preference profile(s) for various merchants or restaurants in terms of eating preferences, meals, various associated services, and the like; as well as update his or her bank or financial institution information for the purpose of (re)directing debits and payments.

Referencing FIG. 7, in particular, the reader is directed to vendor 12, for which the purchaser has provided or input morning, lunch, and dinner order preference data as at 13, 14, and 15 respectively. The purchaser's payment for each of the order preferences may be made by way of a numbered debit account as at 16. Notably, vendor 12 offers consumable goods such as coffee. It is contemplated that the present invention operates particularly well with regularly visited vendors from which typical orders may be sought. A purchaser's order preference for coffee or other good or service during the morning, lunch, dinner, and other columns may thus be input and/or amended as per the election of the customer.

In this last regard, it should be noted that other goods and service providers, while preferred, but may not be targeted for typical everyday orders. The customer or client, however, may wish to designate certain payment data for a particular vendor or service provider. In this regard, the reader is further directed to reference numbers 17 and 18 in FIG. 7. From an inspection of FIG. 7, and a consideration of reference numbers 17 and 18, it will be seen that the customer or client may input a doctor's office 17 and associate a credit card account 18 for that service provider. It will thus be seen that the table or template 105 is easy to maintain, is expandable, and essentially functions to define order or service preferences, as well as payment preferences (or how to preferably process charges for the preferred goods/services). This enables the customer or consumer to effectively manage his or her credit authorizations and payments.

When the vendor or service provider is physically approached by the customer or client (as at 106 in FIG. 6), the vendor service provider is provided with the payment information (such as credit card information) by way of the carried key fob or intelligent device 10. In this last regard, it is contemplated that the purchaser's order preference data and the payment preference data (as exemplified in FIG. 7) may be downloaded to the intelligent device 10 by way of USB port(s) 19 and under the direction or as enabled by certain data inputting means commonly associated with computer hardware.

It may thus be readily seen that the web-site 11 allows for the creation of a purchaser's personal order preferences, which preferences may then be downloaded to a key fob, cellular telephone, or similar other intelligent device 10. It is contemplated that the transmissible data may preferably be stored and transmitted in an encrypted manner so as to enhance the security of the system. In this regard, the reader is further directed to column 20 in FIG. 7, which column depicts various encrypted pointer indices. Further, if the key fob or similar other intelligent device 10 is lost or stolen, it is contemplated that the web-site 11 may preferably comprise means for enabling the user or purchaser to quickly and effectively deactivate all billing.

It is contemplated that the intelligent device 10 may preferably comprise a mini USB port as at 19; a green light display 22 for visually alerting the purchaser that the order is confirmed; a red light display 23 for visually alerting the purchaser that the order is not confirmed or that other methodological problems may have occurred; key ring attachment means 24 for enabling the purchaser to attach the key fob 10 to a key ring; and a radio transmitter. USB port 21, green light display 22, red light display 23, and key ring attachment means 24 are generally depicted and referenced in FIGS. 4 and 6.

From an inspection of the noted figures, it may understood that the mini USB port 19 of the intelligent device 10 allows for downloading data from the Internet via a personal computing unit 103 or similar other means for accessing the Internet. The intelligent device 10 may further comprise a small light emitting diode (LED) window as at 25 for alerting the customer or consumer when more than one vendor establishment 20 is responding to radio transmission(s) 107 to and from the intelligent device 10, as might happen if two or more vendor establishments 20 are in close proximity to the arriving purchaser as symbolically depicted in FIG. 6. When multiple vendors or vendor establishments 20 are responding, it is contemplated that the window 25 may prompt the user to redirect the order and payment preference data to the proper or target vendor.

In this last regard, it is contemplated the user may continue to push a "go" button 21 until the correct vendor or vendor establishment 20 is identified. It is contemplated that the "go" button 21 may be preferably held until the green light display 22 illuminates. The same process may be practiced if the intelligent device 10 is used to pay for items without transmitting preferred order information. If multiple vendors or vendor establishments 20 are responding to a purchaser's signal (as at 107), the purchaser may keep rotating through the vendor listing (displayed on the window 25) with the "go" button 21 until the proper vendor or vendor establishment 20 is selected. The "go" button 21 may then be held down. Preferred payment information may then be authenticated and routed.

It should be understood that the intelligent device 10 essentially and preferably comprises certain means for receiving downloadable data, and certain means for wirelessly transmitting (sending/receiving) the downloaded data following transit of the device 10. In this last regard, it is contemplated that the wirelessly transmitted data may preferably include data such as purchaser's order preference data 100 and payment preference data 101. The data 100 and 101 may be wirelessly transmitted to a select vendor establishment 20 upon physically approaching that establishment as generally depicted and referenced at vector arrow 108 in FIG. 6.

In other words, it is contemplated that the intelligent device 10, having received downloaded data 100 and 101 from the web-site 11, may be carried or otherwise transported to a select vendor establishment 20 and actuated (via a pushable "go" button 21) for wirelessly transmitting the order preference data 100 and the payment preference data 101 to the select vendor establishment 101. It is contemplated that the wireless transmission may be effected by way of a small radio send/receive unit housed within the intelligent device 10 (not specifically illustrated) and housed at the vendor establishment 20. In this regard, it is contemplated that close proximity radio transmissions may well function to enhance the methodology of the current invention.

Thus, as a customer nears a select vendor establishment 20, he or she may press a "go" button 21. The order and/or payment preference data 100/101 is then transmitted to the select vendor establishment 20 and may optionally be printed inside the vendor establishment 20 for record keeping purposes. It is contemplated that the order preference data 100 may include instructions on whether the order is for dine-in or carry-out (as might be the case for a restaurant establishment). The order may then by acknowledged (via a green light display 22) on the key fob or similar other intelligent device 10, and processed according to the order preference data 100. Further, electronic transfer of funds may be effected by way of the transmitted preferred payment information.

Figure 5:
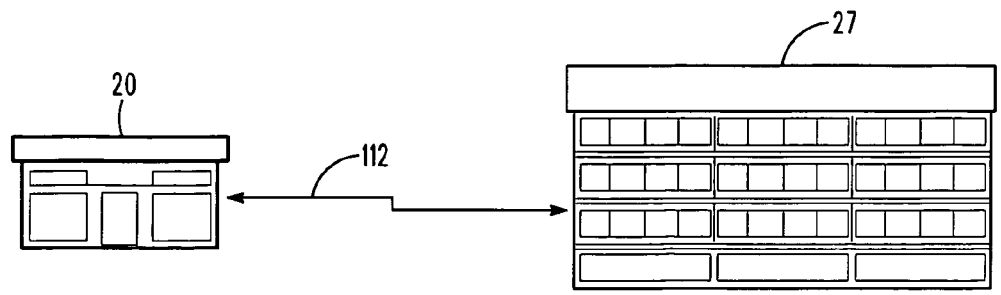
FIG. 5 is a schematic type depiction of the generic vendor establishment otherwise depicted in FIG. 4 transmitting payment information to, and receiving electronic funds settlement from, a generic financial institution.

It may thus be seen that the customer or consumer saves time, is relieved of the need to carry cash, and receives exactly what they want (assuming the order is processed correctly). Further, the select vendor establishment 20 is relieved of the need to hire service personnel to receive orders and to tend a cash register (as at 26) for effecting the sale or transaction. It is contemplated that the select vendor establishment 20 receives electronic compensation daily from the bank or other financial institution 27 through state of the art automated settlements processes as generally depicted in FIGS. 5 and 6 as at 109. However, in this regard, it is contemplated that the customer credit data itself is preferably not received by the vendor establishment 20; rather, it is preferred that the vendor or vendor establishment 20 receives only encrypted pointers to customer or consumer accounts for settlement(s). The customer's credit is thus never at risk. Further, the customer may exert control over the device 10 by way of access through the secured Internet site 11. Since the vendor or vendor establishment 20 does not receive cash by way of the present invention, cash handling is eliminated and the risk of theft or fraud is greatly reduced.

Whereas the foregoing specifications may be said to support certain systemic means for effecting a purchase by way of an intelligent device, it is contemplated that the present invention further teaches certain purchasing methodology. The purchasing method contemplated by the present invention may be said to comprise a series of steps, including an initial step of inputting a purchaser's order preference data 100 and inputting a purchaser's payment preference data 101 at a secure web-site 11 substantially as heretofore described and as referenced at reference numeral 30 in FIGS. 1 and 2. The data 100 and/or 101 may be entered into the database 11 by way of a personal computing unit 103 located within a comfortable business or residential setting as at 29 in FIGS. 3 and 6.

Figure 1:
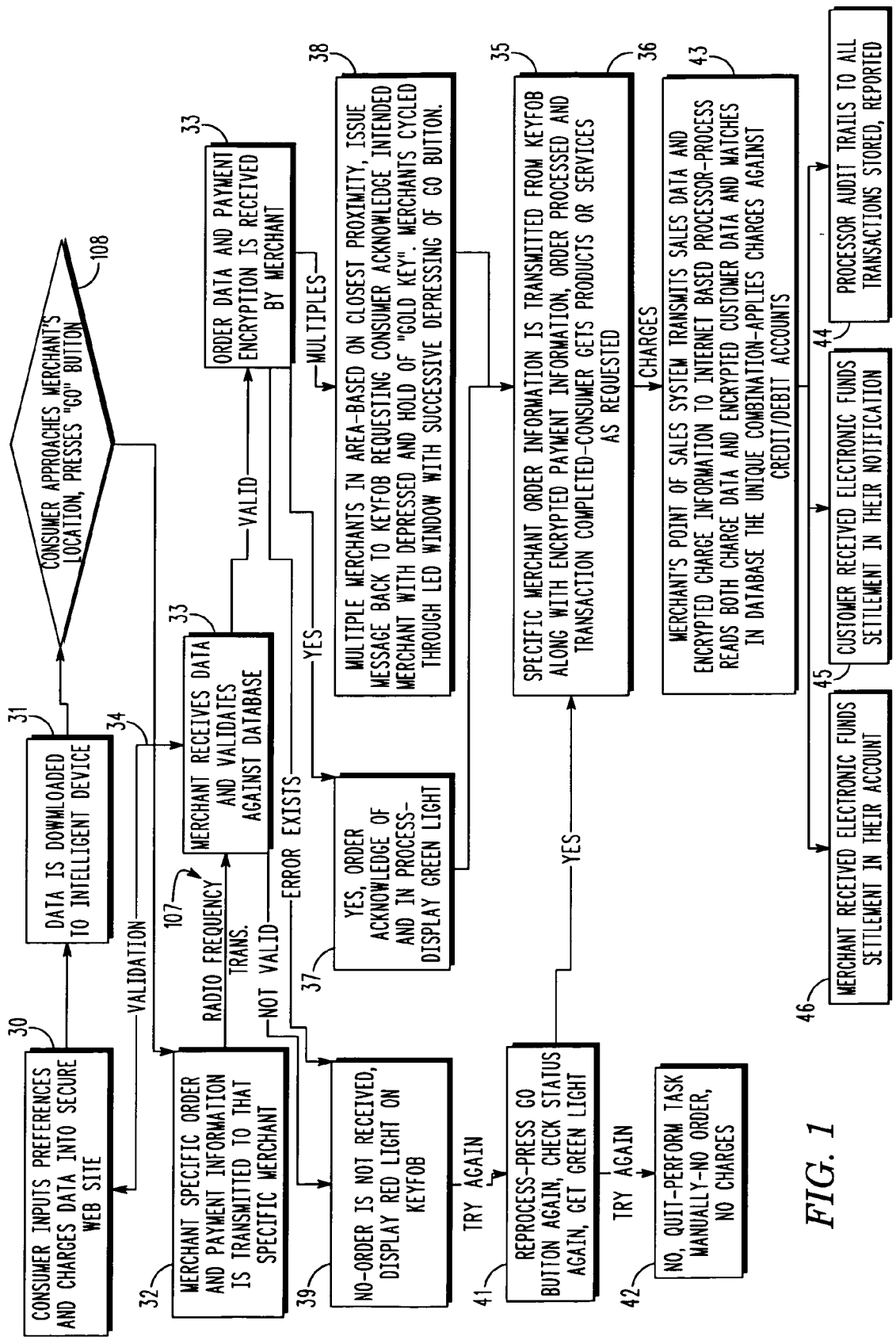
FIG. 1 is a flowchart type depiction setting forth certain order and payment methodology for effecting a purchase according to the present invention.
Figure 2:
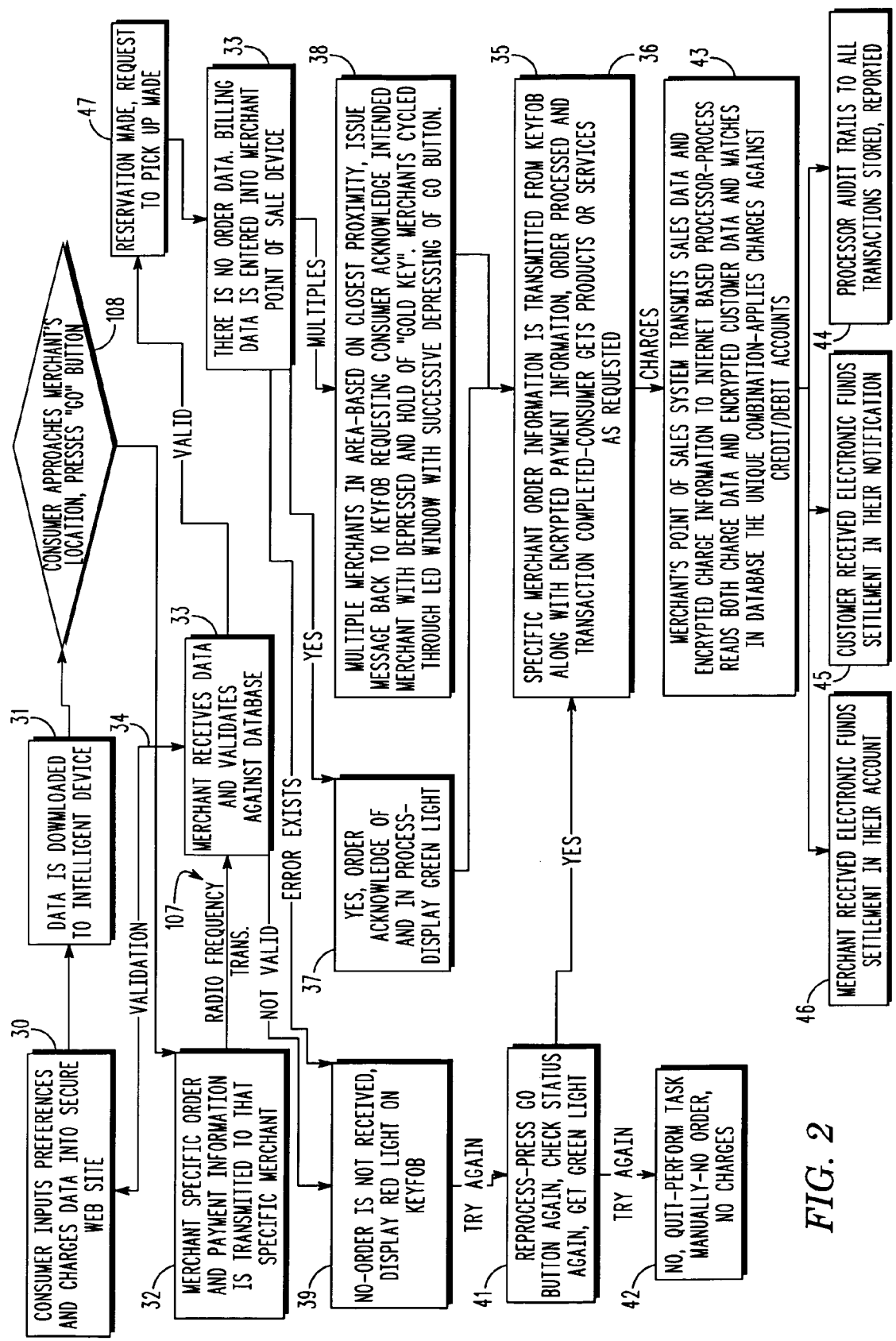
FIG. 2 is a flowchart type depiction setting forth certain payment methodology for effecting a purchase according to the present invention.

After the data 100 and/or 101 are input or otherwise amended at the web-site or database 11, it is contemplated that the data 100 and/or 101 may be downloaded into or onto an intelligent device 10 such as a key fob as referenced at number 31 in FIGS. 1 and 2. It is contemplated that the intelligent device 10 of the present invention is designed for ease of use and transport. The key fob device 10 may thus be carried or otherwise transported 108 (further referenced in FIGS. 1 and 2) as symbolically represented by a generic carrier device or automobile 28 in FIG. 6. Thus, the method of the present invention contemplates a step of carrying the intelligent device 10 to a vendor establishment area 20. The key notion being here addressed is that the intelligent device 10 may well function to house the purchaser's order and/or payment preference data 100, 101 for ease of further transmission to the vendor establishment 20 or vendor establishment area 40 (potentially comprising a plurality of vendor establishments 20) upon arriving in close proximity thereto.

Upon arriving in close proximity to the vendor establishment area 40, the purchaser may then transmit 32 the device-carried order preference and/or payment preference data 100, 101 to the vendor establishment area from the intelligent device 10 as referenced in FIGS. 1 and 2. In this last regard, it should be noted from an inspection of FIGS. 1 and 2, that the difference between the subject figures is essentially that FIG. 1 depicts flowchart diagram methodology for transmitting both order preference data 100 and payment preference data 101 to the vendor establishment(s) 20, whereas FIG. 2 depicts a flowchart diagram methodology for transmitting only payment preference data to the vendor establishment(s) 20.

The vendor establishment area 40 may thus receive the transmitted order preference data and/or payment preference data 100, 101 as depicted and referenced at 33 in FIGS. 1 and 2. After receiving the data 100 and/or 101, the data may preferably be validated as at 34, and processed as at 35 in FIGS. 1 and 2. Notably, the act of processing the data 100 and/or 101 as at 35 may be defined by processing the purchaser's order preference data 100 for effecting a delivered order; and transacting a sale by way of the payment preference data 101 (preferably encrypted). The processing of the payment preference data 101 may be intermediate the select or target vendor establishment 20 and the financial institution 27 according to state of the art methods. After the sale is transacted or processed, the processed order (e.g. a coffee) may be delivered (as at 36 in FIGS. 1 and 2) to the purchaser as generally depicted by vector arrow 110 and a coffee symbol 111 in FIG. 6.

It is contemplated that a number of additional steps may be implemented as a means to enhance the basic processes involved. In this regard, it is contemplated, for example, that the method may comprise the step of acknowledging receipt (as at acknowledgement(s) 37) of the transmitted order and/or payment preference data 100/101 after receiving the transmitted order/payment preference data 100/101 as generally depicted at 37 in FIGS. 1 and 2. If the data are not received, an error alert may be sent to the purchaser by way of the red light display 23 as generally referenced at 39 in FIGS. 1 and 2. If the red light display 23 is received signaling an error in transmission, the purchaser may attempt to reprocess the order transmission by hitting the "go" button 21 as at 41 in FIGS. 1 and 2. If the purchaser again receives a red light display 23 or other error message, he or she may elect to place an order manually or by way of more conventional method(s) as at 42 in FIGS. 1 and 2. It is thus contemplated that the methodology of the present invention may preferably comprise certain steps for alerting the purchaser to a methodological problem or error.

Further, it is contemplated that the step of validating the received order preference 100 and/or payment preference data 101 may comprise the steps of transmitting/receiving a confirmation request as at 38 in FIGS. 1 and 2. Notably, the confirmation request may well function to confirm a target vendor within the vendor establishment area. In other words, if the purchaser approaches the vendor establishment area 40, and transmits data, several vendors may reply and transmit a confirmation request, whereafter the purchaser may select the target vendor establishment 20 from a possible listing as possibly displayed upon the window 25.

The method may further comprise the steps of transmitting sales data and certain payment data to the web-site 11 from the vendor establishment area 40 after or during the step of transacting the preferred payment data 101 as generally referenced at 43 in FIGS. 1 and 2, whereafter the web-site or server hosting the web-site may receive the sales data and payment data as transmitted from the vendor establishment area 40 and apply charges accordingly against credit/debit accounts. The methodology may comprise the step of updating certain database information with the purchase payment information; and electronic funds settlement may be transferred (as at 112) to one or more of the vendor's receivable account(s) for finalizing the transaction as generally depicted at 46 in FIGS. 1 and 2.

The transaction events (i.e. the processed order and the transacted sale) may thus be logged after or during the step of receiving the sales data and purchase payment information, and the purchaser may be notified of the electronic funds settlement transfer as at 45 in FIGS. 1 and 2 for record keeping purposes. Indeed, all transactions may preferably be made the subject of audit trailing as generally referenced at 44 in FIGS. 1 and 2. After a transaction is finalized, the purchaser may elect to amend his or her preferences. In this regard, it is contemplated that the purchaser may amend the order preference data 100 and/or payment preference data 101 by again accessing the web-site 11 and inputting certain preference data. In other words, the method may comprise the step of amend the preference data during the step of inputting the preference data.

While the above descriptions contain much specificity, this specificity should not 1 5 be construed as limitations on the scope of the invention, but rather as an exemplification of the invention. For example, the invention may be said to essentially teach or disclose a transaction system and method for effecting a purchase or transacting a sale. A customer's preferred order and payment information may be input into a database as accessed through a preference data web-site (as at 11). The preference data may then be downloaded into a hand-holdable key fob or personal transmission device 10. The key fob or personal transmission unit 10 thus comprises means for receiving, housing, and wirelessly transmitting the purchaser's order preference and payment preference data.

The preference data may be transmitted to at least one vendor establishment by carrying the personal transmission unit 10 to a select vendor establishment area and actuated by push-button means. Each vendor establishment preferably comprises means for wirelessly receiving transmitted data, means for processing received data, means for validating received data, and means for delivering an order as requested from the received data. The intelligent device or personal transmission unit 10 thereby enables a purchaser to transmit device-housed order preference and payment preference data to the vendor establishment. The vendor establishment (1) receives the transmitted order preference and payment preference data; (2) validates the received order preference and payment preference data; (3) processes the order preference data; (4) transacts a sale by way of the payment preference data; and (5) delivers a processed order to a purchaser.

The system may be said to further preferably and essentially comprise (1) certain means for acknowledging receipt of the transmitted order preference and payment preference data after receiving the same; (2) certain means for transmitting transaction data to the preference data web-site from the vendor establishment; (3) certain means for updating the preference data web-site; (4) certain means for logging transaction events; (5) certain means for transferring electronic funds settlement to a vendor account; (6) certain means for notifying the purchaser of electronic funds settlement transfer; and (7) certain means for alerting the purchaser to a methodological problem, such as non-receipt of transmission, insufficient funds, order problems, multiple vendor conflicts, unsecured transmission, etc.

The present invention further contemplates certain transaction methodology or purchasing methodology for effecting a purchase by way of a personal transmitter and/or locating an otherwise displaced person either by way of a signal received by vendor(s) or by way of a purchase trail left at vendor(s). The purchasing method may be said to essentially comprise the steps of: inputting a purchaser's order preference data and a purchaser's payment data at a secure web-site; downloading the purchaser's order preference and payment data to an intelligent device from the web-site; carrying the intelligent device to a vendor establishment area, the intelligent device housing the purchaser's order preference and payment data; transmitting device-carried order preference and payment data to the vendor establishment area from the intelligent device; receiving the transmitted order preference data and payment data at the vendor establishment area; validating the received purchaser's order preference and payment data; processing the purchaser's order preference data; transacting a sale by way of the payment data thereby amending the payment data; and delivering a processed order to the purchaser at the vendor establishment. The method for locating a displaced person by way of a personal transmitter may be said to preferably comprise the steps of: inputting personal data at a web-site; downloading the personal data to a transmitter; carrying the transmitter with personal data to a vendor establishment area; transmitting transmitter-carried personal data to the vendor establishment area from the transmitter; and locating a displaced person (who may activate the transmitter when nearing the vendor establishment area) by way of the personal data as transmitted to the vendor establishment area.

It is noted that order preference data and payment preference data are not necessarily both required to effect a purchase. In other words, if the target vendor is a service provider, offering only one service, such as a car wash or oil change, the customer may simply wish to designate a preferred payment for that transaction. In this regard, the method may omit preferred order data and instead simply transmit preferred payment information. In this last regard, it is contemplated that if the preferred payment data is properly validated, a reservation for services or a request to pick-up a unilateral or one dimensional order (an order for a service or product without preferences) may be made as referenced at 47 in FIG. 2.

Certain preferred steps may include acknowledging receipt of the transmitted order preference and/or payment preference data after receiving the transmitted preference data. Further, the method may comprise the step of validating the received order preference and/or payment preference data by way of transmitting a confirmation request (in the event of multiple vendors in a vendor establishment area). In other words, the confirmation request essentially functions to confirm a select target vendor within the vendor establishment area. The personal transmitter may then receive the transmitted confirmation request during the step of validating the received order preference and payment data.

The information generated from the transaction event may then be transmitted to the preference data web-site from the vendor establishment area after transacting or during the sale by way of the payment preference data. Settling accounts naturally follows a sales transaction and thus the step of transferring electronic funds settlement to a vendor account may be included, as well as notifying the purchaser of the electronic funds settlement transfer. All transaction events may be logged or otherwise made the subject of audit trailing after or during the sales transaction for record-keeping purposes. Methodological problems may arise and thus certain steps may be taken to alert the user of an error. Further, the preference data may change as per the preference(s) of the purchaser. In this regard, it is contemplated that the web-site may be easily amended and/or updated (for further download to the personal transmitter 10) as a means to loop through the transaction methodology.

Although the invention has been described by reference to a system of broad-based components and certain methodology as supported thereby, it is not intended that the novel transaction system(s) and method(s) be limited thereby, but that modifications thereof are intended to be included as falling within the broad scope and spirit of the foregoing disclosure and the appended drawings. For example, the foregoing specifications support a transaction method enabled by a hand-holdable or hand held personal transmitter, which transmitter receives, houses, and transmits personal preference data to a vendor establishment for decreasing processing time and improving product flow. Thus, the invention may be said to comprise a system and method supported by these basic notions and as enabled by the teachings set forth in this disclosure.

I claim:

1. A method for transacting a sale by way of a personal transmitter, the method comprising the steps of:

accessing a consumer-maintained web-site via data input means;

displaying an order and payment preference template at the consumer-maintained web-site;

inputting order preference data and payment preference data into the order and payment preference template at the consumer-maintained web-site;

associating encrypted customer payment-specific pointers with the order preference data and payment preference data;

downloading the order preference data, payment preference data, and encrypted customer payment-specific pointers to a transmitter from the consumer-maintained web-site;

storing the order preference data, payment preference data, and encrypted customer payment-specific pointers as encrypted data upon the transmitter;

carrying the transmitter with said encrypted data to a vendor establishment area;

transmitting the transmitter-carried encrypted data to the vendor establishment area from the transmitter;

receiving the transmitter-carried encrypted data at at least one vendor located within the vendor establishment area;

validating the transmitted order and payment preference data via the customer payment-specific pointers by way of:

transmitting sales data and encrypted charge data to web-based processor, reading encrypted charge data and encrypted customer data by the web-based processor; and matching encrypted charge data and encrypted customer data against a pre-stored database accessed by the web-based processor;

processing the validated order and payment preference data by way of:

applying charges against a consumer account;

transferring charges to vendor account; and delivering a preferred order to a purchaser via at least one vendor at the vendor establishment area.

2. The method of claim 1 comprising the step of acknowledging receipt of the transmitted order and payment preference data, said step providing the purchaser with a sales-based character string, the sales-based character string being uniquely associated with the sales-charges, the sales-charges being payable at the consumer-maintained web-site via the sales-based character string.

3. The method of claim 1 wherein the step of validating the transmitted order and payment preference data comprises the step of transmitting a confirmation request, the confirmation request for confirming a target vendor from at least one vendor within the vendor establishment area.

4. The method of claim 1 comprising the step of transmitting transaction event data to the consumer-maintained web-site from at least one vendor at the vendor establishment area after processing the order and payment preference data.

5. The method of claim 1 comprising the step of transmitting transaction event data to the consumer-maintained web-site from at least one vendor at the vendor establishment area while processing the order and payment preference data.

6. The method of claim 1 comprising the step of notifying the purchaser of electronic funds transfer.

7. The method of claim 1 comprising the step of logging transaction events after finally processing the order and payment preference data.

8. The method of claim 1 comprising the step of alerting the purchaser to a methodological problem.

9. The method of claim 1 comprising the step of amending the order and payment preference data during the step of inputting the order and payment preference data.

10. A method for effecting a purchase by way of a personal transmitter, the method comprising the steps of:

accessing a web-site via data input means;

displaying an order and payment preference template at the web-site;

inputting preference data into the order and payment preference template at the web-site;

associating encrypted customer payment-specific pointers with the order preference data and payment preference data;

downloading the preference data and encrypted customer payment-specific pointers to a transmitter;

storing the order preference data, payment preference data, and encrypted customer payment-specific pointers as encrypted data upon the transmitter;

carrying the transmitter with said encrypted data to a vendor establishment area;

transmitting the transmitter-carried encrypted data to the vendor establishment area from the transmitter;

receiving the transmitter-carried encrypted data at at least one vendor located within the vendor establishment area;

processing the encrypted data by way of applying sales-charges against a consumer account;

transferring sales-charges to vendor account; and delivering a preferred order to a purchaser via at least one vendor at the vendor establishment area.

11. The method of claim 10 comprising the step of acknowledging receipt of the transmitted preference data, said step providing the purchaser with a sales-based character string, the sales-based character string being uniquely associated with the sales-charges, the sales-charges being payable at the consumer-maintained web-site via the sales-based character string.

12. The method of claim 10 comprising the step of validating the transmitted preference data before processing the encrypted data via the customer payment-specific pointers by way of:

transmitting sales data and encrypted charge data to web-based processor;

reading encrypted charge data and encrypted customer data by the web-based processor; and matching encrypted charge data and encrypted customer data against a pre-stored database accessed by the web-based processor.

13. The method of claim 12 wherein the step of validating the transmitted preference data comprises the step of transmitting a confirmation request, the confirmation request for confirming a target vendor from at least one vendor within the vendor establishment area.

14. The method of claim 10 comprising the step of transmitting transaction event data to the web-site from at least one vendor at the vendor establishment area after processing the encrypted data.

15. The method of claim 10 comprising the step of transmitting transaction event data to the web-site from the vendor establishment area while processing the encrypted data.

16. The method of claim 10 comprising the step of notifying the purchaser of electronic funds transfer.

17. The method of claim 10 comprising the step of logging transaction events after finally processing the encrypted data.

18. The method of claim 10 comprising the step of alerting the purchaser to a methodological problem.

19. The method of claim 10 comprising the step of amending the preference data during the step of inputting the preference data.

20. A purchasing system, the purchasing system for transacting a sale by way of a personal transmitter, the purchasing system comprising:

a consumer-maintained web-site, the consumer-maintained web-site comprising an order and payment preference template for receiving and storing a purchaser's order and payment preference data;

means for inputting the purchaser's preference data at the consumer-maintained web-site;

means for associating encrypted customer payment-specific pointers with the order preference data and payment preference data;

a transmitter, the transmitter comprising means for receiving and storing downloadable data and means for wirelessly transmitting data, the purchaser's order and payment preference data and encrypted customer payment-specific pointers being downloadable into the transmitter from the consumer-maintained web-site, the transmitter for receiving, storing, and wirelessly transmitting the purchaser's order and payment preference data, and encrypted customer payment-specific pointers; and at least one vendor establishment, each vendor establishment comprising means for wirelessly receiving transmitted data, means for processing received data; and means for delivering an order as requested from the received data, the transmitter thus enabling a purchaser to transmit transmitter-stored order and payment preference data and customer payment-specific pointers to the vendor establishment, the vendor establishment for receiving the transmitted order and payment preference data and customer payment-specific pointers; processing the order and payment preference data, and delivering a processed order to the purchaser.

21. The system of claim 20 wherein each vendor establishment comprises means for validating received order and payment preference data and encrypted customer payment-specific pointers as encrypted data, said encrypted data thus being validatable before the order and payment preference data is processable.

22. The system of claim 20 comprising means for acknowledging receipt of the transmitted order and payment preference data, and encrypted customer payment-specific pointers, said means providing the purchaser with a sales-based character string, the sales-based character string being uniquely associated with the sales-charges, the sales-charges being payable at the consumer-maintained web-site via the sales-based character string.

23. The system of claim 20 comprising means for transmitting transaction event data to the consumer-maintained web-site.

24. The system of claim 20 comprising means for transferring electronic funds to a vendor account.

25. The system of claim 20 comprising means for logging transaction events.

26. The system of claim 20 comprising means for alerting the purchaser to a methodological problem.

* * * * *